US008824680B2

(12) United States Patent
King et al.

(10) Patent No.: US 8,824,680 B2
(45) Date of Patent: Sep. 2, 2014

(54) CENTRALIZED KEY GENERATION (75) Inventors: William C. King, Lafayette, CA (US);
Bjorn Hjelm, Livermore, CA (US);
Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/569,531

(22) Filed: Aug. 8, 2012

(65) Prior Publication Data
US 2014/0044263 A1 Feb. 13, 2014

(51) Int. Cl.
*H04L 9/00* (2006.01)
(52) U.S. Cl.
USPC .......................................... 380/270; 380/276
(58) Field of Classification Search
None
See application file for complete search history.

(56) References Cited

U.S. PATENT DOCUMENTS

| | | | | |
|---|---|---|---|---|
| 5,794,139 | A * | 8/1998 | Mizikovsky et al. | 455/403 |
| 6,477,644 | B1 * | 11/2002 | Turunen | 713/161 |
| 6,570,843 | B1 * | 5/2003 | Wolfgang | 370/216 |
| 6,873,853 | B2 * | 3/2005 | Kim | 455/466 |
| 6,876,747 | B1 * | 4/2005 | Faccin et al. | 380/247 |
| 7,359,511 | B2 * | 4/2008 | Matsuzaki et al. | 380/212 |
| 7,376,829 | B2 * | 5/2008 | Ranjan | 713/153 |
| 7,941,512 | B2 * | 5/2011 | Droms et al. | 709/222 |
| 7,974,241 | B2 * | 7/2011 | Aaron | 370/331 |
| 8,103,271 | B2 * | 1/2012 | Calderhead et al. | 455/431 |
| 8,121,599 | B2 * | 2/2012 | Gerber et al. | 455/436 |
| 8,190,896 | B2 * | 5/2012 | Ryu | 713/171 |
| 8,325,922 | B1 * | 12/2012 | Sun et al. | 380/270 |
| 8,341,661 | B2 * | 12/2012 | Kabuto et al. | 725/25 |
| 8,396,470 | B2 * | 3/2013 | Wormald | 455/432.1 |
| 8,406,772 | B2 * | 3/2013 | Olson | 455/440 |
| 8,462,946 | B2 * | 6/2013 | Doehla et al. | 380/217 |
| 2005/0213538 | A1 * | 9/2005 | Ebiko et al. | 370/331 |
| 2006/0236334 | A1 * | 10/2006 | Luccisano et al. | 725/31 |
| 2007/0076094 | A1 * | 4/2007 | Dickerson et al. | 348/143 |
| 2007/0162981 | A1 * | 7/2007 | Morioka et al. | 726/30 |
| 2007/0263867 | A1 * | 11/2007 | Soda et al. | 380/239 |
| 2007/0286423 | A1 * | 12/2007 | Soda et al. | 380/239 |
| 2008/0059631 | A1 * | 3/2008 | Bergstrom et al. | 709/224 |
| 2008/0125128 | A1 * | 5/2008 | Yoo et al. | 455/437 |
| 2009/0042563 | A1 * | 2/2009 | Bernard | 455/432.1 |
| 2009/0147960 | A1 * | 6/2009 | Maeda et al. | 380/277 |
| 2009/0275346 | A1 * | 11/2009 | Bauman et al. | 455/456.2 |
| 2009/0280741 | A2 * | 11/2009 | Krinsky | 455/3.06 |
| 2010/0290627 | A1 * | 11/2010 | Tsuji et al. | 380/282 |
| 2011/0044240 | A1 * | 2/2011 | Jang et al. | 370/328 |
| 2011/0106969 | A1 * | 5/2011 | Choudhury et al. | 709/236 |
| 2011/0124283 | A1 * | 5/2011 | DeLuca | 455/3.06 |
| 2011/0164516 | A1 * | 7/2011 | Kalkunte et al. | 370/252 |
| 2013/0083722 | A1 * | 4/2013 | Bhargava et al. | 370/315 |

* cited by examiner

*Primary Examiner* — Cordelia Zecher
*Assistant Examiner* — Richard McCoy (57) ABSTRACT

A first network device is configured to receive a request for a secret key, generate the secret key, and send the secret key to a second network device, a third network device, and a wireless user device. The second network device may send content, encrypted with the secret key, to the wireless user device. The third network device may send content, encrypted with the secret key, to the wireless user device when the second network device is not sending content to the wireless user device. The wireless user device may use the secret key to decrypt the content received from the second network device or the third network device.

20 Claims, 8 Drawing Sheets

CENTRALIZED KEY GENERATION

BACKGROUND

Evolved multimedia broadcast and multicast service (eMBMS) allows for a Third Generation Partnership Project (3GPP) cellular network to simultaneously send content from one source to multiple user devices. Broadcast service may refer to sending content to all users. Multicast may refer to sending content to user devices that are members of a specified group (e.g., subscribers to basketball game content from a content provider). The content, being sent to each user device, may be securely transmitted by using a secret key to prevent unauthorized user devices from receiving the content. One secret key may be used to securely transmit content to a user device when the user device is in one particular coverage area of a network, and another secret key may be used to securely transmit content to the user device when the user device is in another coverage area of the network.

DETAILED DESCRIPTION OF PREFERRED EMBODIMENTS

The following detailed description refers to the accompanying drawings. The same reference numbers in different drawings may identify the same or similar elements.

Systems and/or methods described herein may generate a secret key that can be used by one network device to transmit encrypted content to a user device in one coverage area of a network, and another network device may use the same secret key to transmit encrypted content to the user device in another coverage area of the network. For example, a network device may provide content to a user device located in a particular coverage area of a network. The network device may receive content from a content provider, and the network device may encrypt the content being sent to the user device.

The network device may use a secret key to encrypt the content received from the content provider. The secret key may be generated and sent to the network device (that provides content to the user device in a particular coverage area of the network) and to other network devices that provide the content to the user device in other coverage areas of the network. The secret key may also be sent to the user device which will decrypt the encrypted content from a particular network device, depending on which particular coverage area the user device is located. Thus, the same secret key may be used to protect content being sent to the user device from any network device that provides service to a particular coverage area of the network.

While the following description focuses on the 3GPP Long Term Evolution (LTE) standard, it will be appreciated that systems and/or methods, described herein, are equally applicable to other wireless standards, such as a wireless fidelity ("WiFi") standard.

Figure 1A:
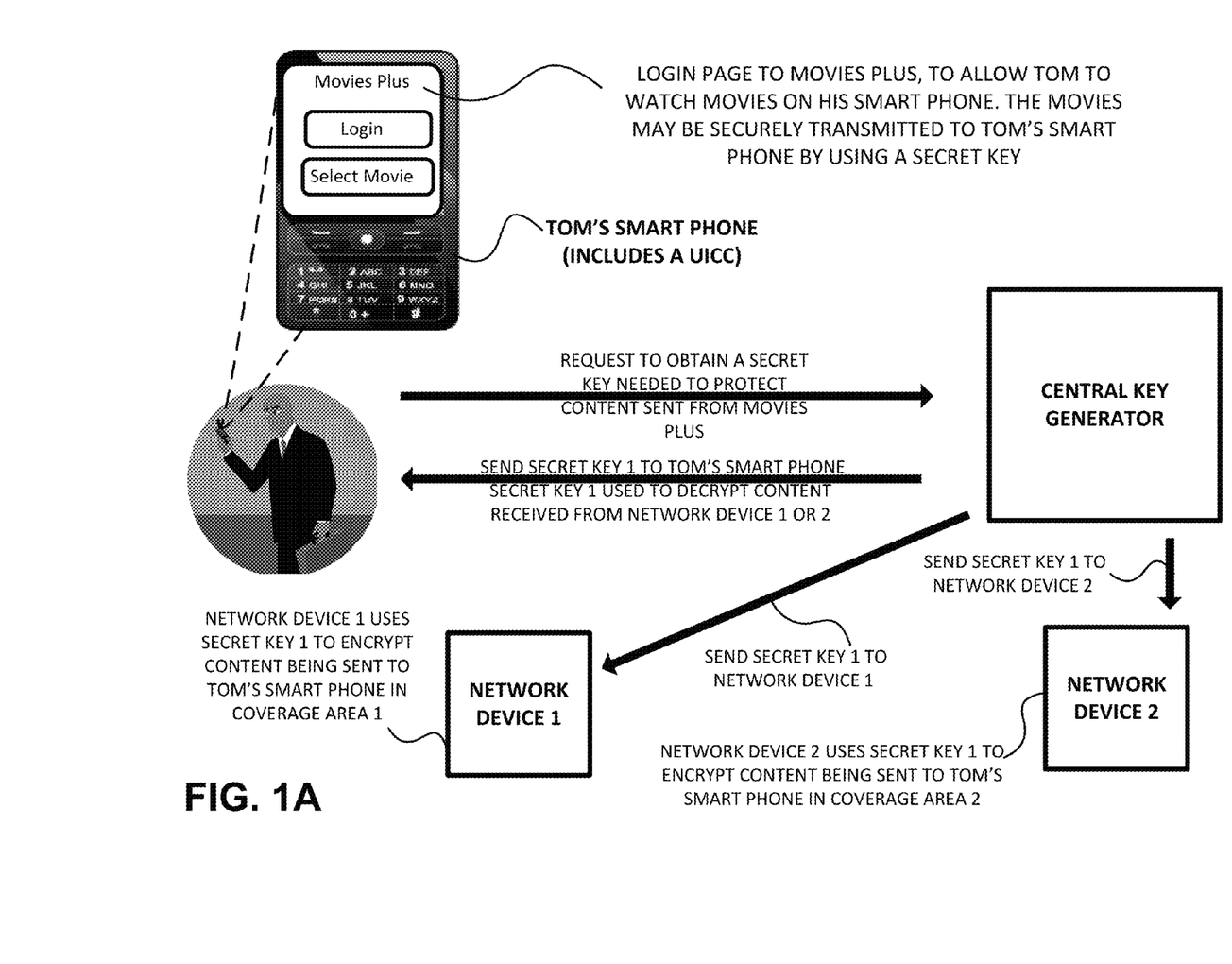
FIGS. 1A-1B are diagrams of an overview of an implementation described herein.
Figure 1B:
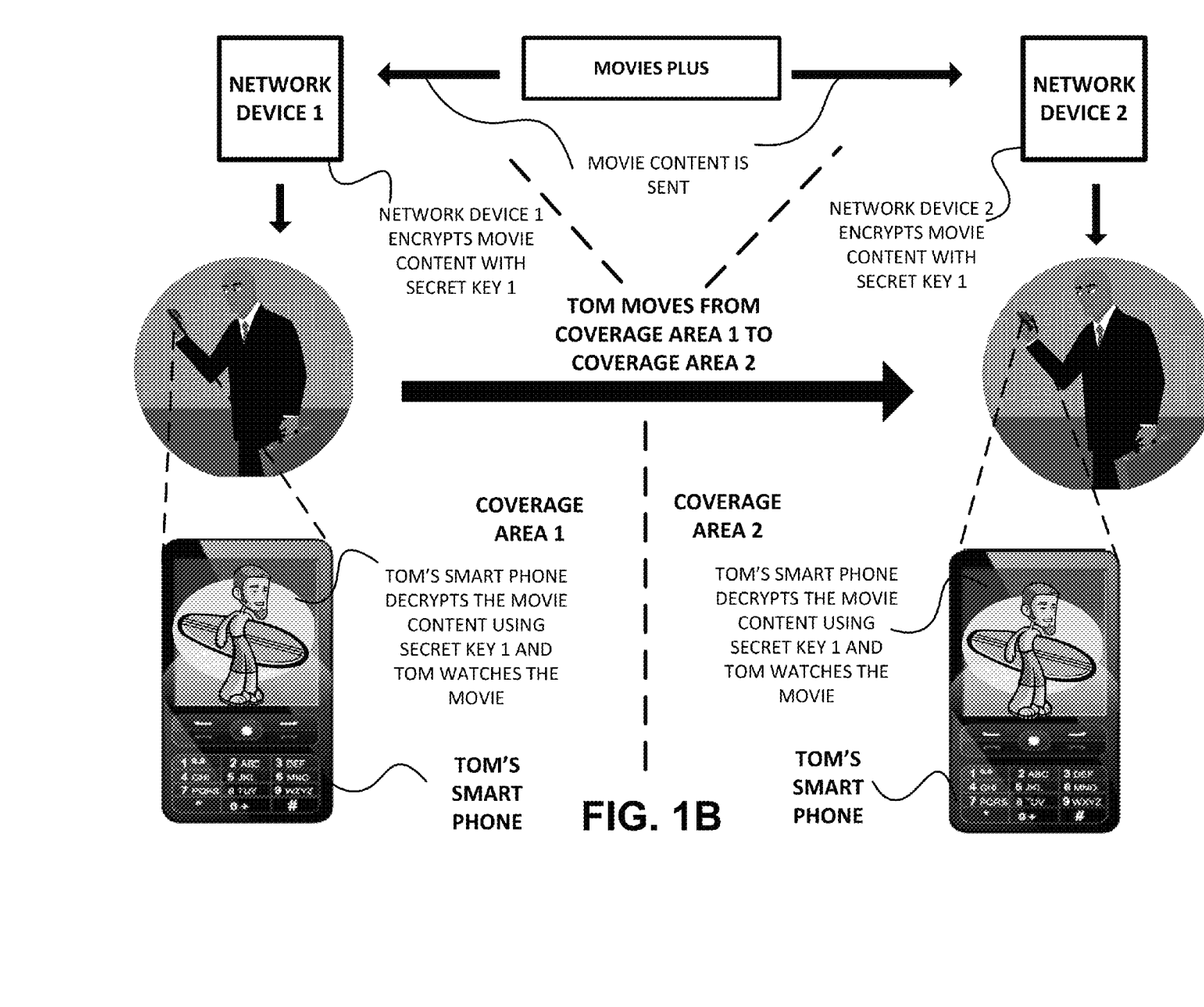

FIGS. 1A and 1B are diagrams of an overview of an implementation described herein. FIG. 1A shows Tom's smart phone, a central key generator, network device 1, and network device 2. As shown in FIG. 1A, Tom is using his smart phone and would like to log into a service, "Movies Plus," to watch a movie about surfing. Tom is a subscriber to Movies Plus. Movies Plus is a content provider that uses eMBMS security procedures to securely transmit content (e.g., by using a secret key) to subscribers of Movies Plus. The content from Movies Plus may be sent to Tom's smart phone, via network device 1 or network device 2. Network device 1 may be used to send content, from Movies Plus, to Tom's smart phone when Tom's smart phone is located in coverage area 1. Network device 2 may be used to send content, from Movies Plus, to Tom's smart phone when Tom's smart phone is located in coverage area 2. Network device 1 and network device 2 may use a secret key to encrypt content, from Movies Plus, being sent to Tom's smart phone. Tom's smart phone may use the same secret key to decrypt the content received from network device 1 or network device 2.

For a subscriber to receive content (being protected with a secret key) from Movies Plus, the subscriber (such as Tom) and the subscriber's user device (Tom's smart phone) may be validated by the network that Tom uses for receiving services to his smart phone. Assume, that once Tom enters his login information, the network may validate that Tom is an authorized subscriber to Movies Plus. Also assume that the network may also validate that Tom's smart phone is authorized to use the network.

Once Tom and Tom's smart phone are authorized to receive content from Movies Plus, Tom's smart phone may send a request to obtain a secret key (for protecting content from Movies Plus) to a key generator. The central key generator may receive the request for a secret key. The central key generator may generate secret key 1. Tom's smart phone may include a universal integrated circuit card (hereinafter referred to as "UICC") that may receive secret key 1 from the central key generator. The UICC may send the secret key to Tom's smart phone. Tom's smart phone may use secret key 1 to decrypt securely transmitted content from network device 1 or network device 2. The central key generator may also send secret key 1 to network device 1 and network device 2. Network device 1 and network device 2 may use secret key 1 to encrypt content from Movies Plus and send the encrypted content to Tom's smart phone.

As shown in FIG. 1B, Tom is watching the surfing movie on his smart phone. Assume that Tom's smart phone, network device 1, and network device 2 have received secret key 1, described with regard to FIG. 1A. Tom is located in coverage area 1. Movies Plus may send the movie content to network device 1. Network device 1 may receive the movie content and encrypt the movie content with secret key 1. Network device 1 may send the encrypted movie content to Tom's smart phone. Tom's smart phone may receive the encrypted movie content from network device 1 and decrypt the movie content by using secret key 1. Once the movie content is decrypted, Tom may view the movie on his smart phone. As shown in FIG. 1B, Tom is watching the movie in coverage area 1.

As Tom is watching the movie, Tom decides to take a commuter train from his office, in coverage area 1, to his home in coverage area 2. As Tom moves from coverage area 1 to coverage area 2, Tom is still watching the movie. As Tom enters coverage area 2, Movies Plus may send the movie content to network device 2. Network device 2 may provide service in coverage area 2. Network device 2 may receive the movie content and encrypt the movie content with secret key 1. Network device 2 may send the encrypted movie content to Tom's smart phone (now located in coverage area 2). Tom's smart phone may receive the encrypted movie content from network device 2 and decrypt the movie content by using secret key 1. Thus, Tom may continue to watch the movie in coverage area 2.

As a result, a single secret key may be used by multiple network devices (with each network device providing service to a particular coverage area of a network) to send encrypted content (with the single secret key) to a user device that is moving between different coverage areas of the network. This may allow for content to be protected without requiring a different secret key to protect content each time the user device changes coverage areas of a network. The generation of a single secret key for multiple coverage areas, instead of generating a different secret key for each coverage area, may prevent the interruption of content being transmitted to the user device each time that the user device changes to a different coverage area of a network.

Figure 2:
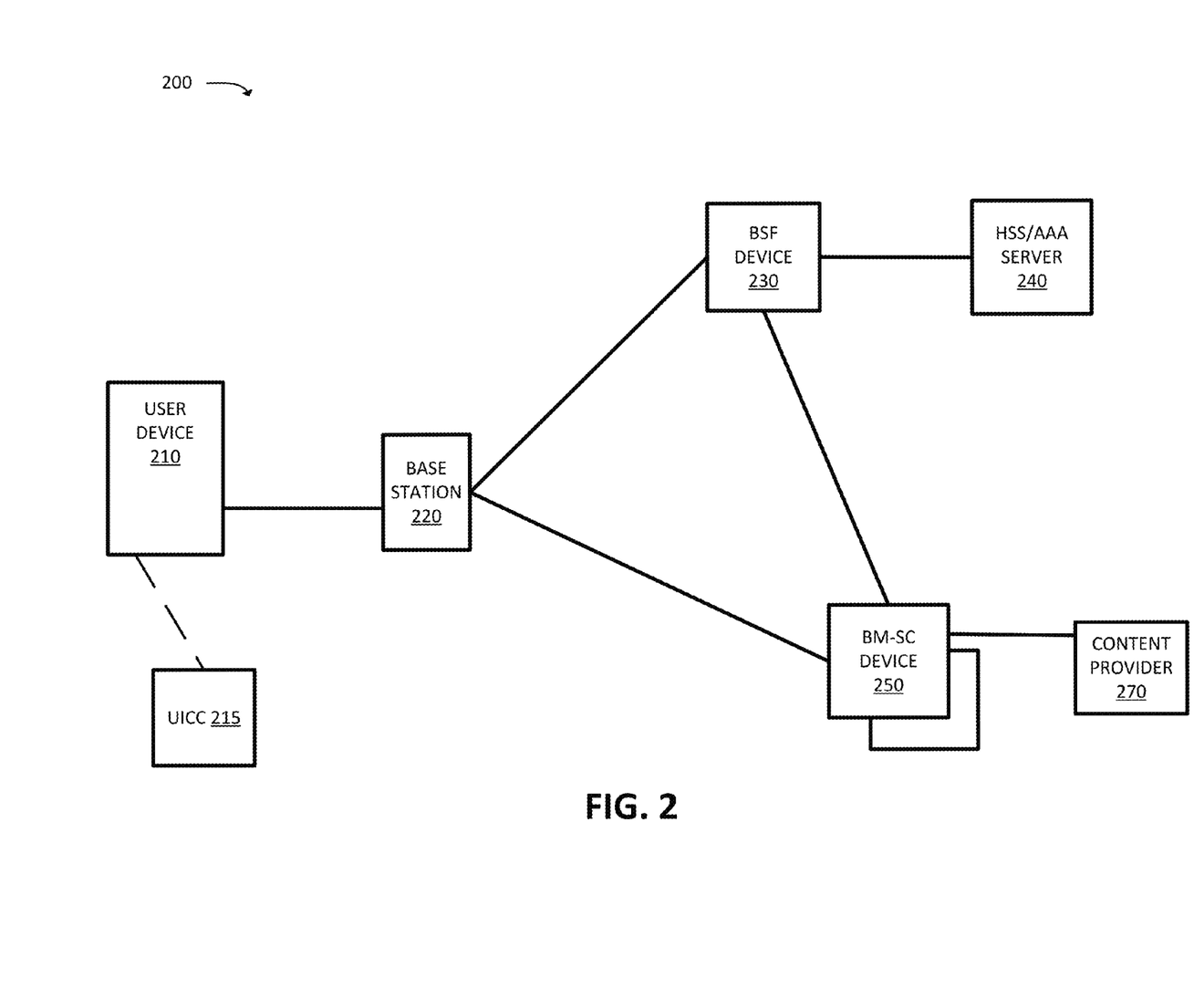
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a universal integrated circuit card 215 (hereinafter referred to as "UICC 215"), a base station 220, a bootstrapping server function device 230 (hereinafter referred to as "BSF device 230"), a home subscriber server (HSS)/authentication, authorization, accounting (AAA) server 240 (hereinafter referred to as "HSS/AAA server 240"), a broadcast/multicast service device 250 (hereinafter referred to as "BM-SC device 250"), and content provider 270.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200.

Devices of environment 200 may interconnect via wired connections, wireless connections, or a combination of wired and wireless connections by using one or more of the following types of networks: a cellular network, a public land mobile network (PLMN), a second generation (2G) network, a third generation (3G) network, a fourth generation (4G) network, a fifth generation (5G) network, a local area network (LAN), a wide area network (WAN), a metropolitan network (MAN), a LTE network, a telephone network (e.g., the Public Switched Telephone Network (PTSN)), an ad hoc network, a managed IP network, a virtual private network (VPN), an intranet, the Internet, a fiber optic-based network, and/or combination of these or other types of networks.

User device 210 may include any computation or communication device, such as a wireless mobile communication device that is capable of communicating with a network (e.g., LTE network). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, computation, or communication device.

User device 210 may include a variety of applications, such as, for example, an email application, a telephone application, a camera application, a video application, a multimedia application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

UICC 215 may correspond to a UICC or another type of smart card. UICC 215 may include an integrated circuit and may facilitate the connection of user device 210 to a network, such as a LTE network. UICC 215 may include one or more subscriber identity modules (SIMs). UICC 215 may request data from network devices and perform calculations, based on the requested data, to authenticate user device 210. UICC 215 may receive information relating to secret keys used in the process of decrypting incoming content from BM-SC device 250.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to BSF device 230 and BM-SC device 250. Base station 220 may send traffic to and/or receive traffic from user device 210 via an air interface. One or more of base stations 220 may be associated with a radio area network (RAN), such as a LTE network.

BSF device 230 may include one or more network device, or other types of computation or communication devices, that gather, process, and/or provide information in a manner described herein. For example, BSF device 230 may provide application independent functions for mutual authentication of mobile devices (e.g., user device 210) and application devices (e.g., BM-SC device 250) to each other and for "bootstrapping" the exchange of secret session keys afterwards. The bootstrap procedure may be initiated, for example, during initial power-up of user device 210 or in response to a message from a device (e.g., BM-SC device 250) instructing user device 210 to begin a bootstrap operation.

HSS/AAA server 240 may include one or more network devices, or other types of computation or communication devices, that gather, process, search, store, and/or provide information in a manner described herein. For example, HSS/AAA server 240 may manage, authenticate, update, and/or store, in a memory associated with HSS/AAA server 240, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. HSS/AAA server 240 may store information associated with a UICC (e.g., UICC 215). In some implementations, HSS/AAA server 240 may interact with BSF device 230. Additionally, or alternatively, HSS/AAA server 240 may include a device that performs authentication, authorization, and/or accounting (AAA) operations associated with a communication session with user device 210.

BM-SC device 250 may include one or more network devices, or other types of computation or communication devices, that gather, process, and/or provide information in a manner described herein. For example, BM-SC device 250 may permit user device 210 to access content (from content provider 270), based on authentication information received from HSS/AAA server 240 and/or BSF device 230. BM-SC device 250 may interact with BSF device 230 and/or HSS/AAA server 240 to initiate authentication functions of user device 210. Additionally, or alternatively, BM-SC device 250 may interact with user device 210 to receive authentication information and present authentication information to BSF device 230 and/or HSS/AAA server 240. BM-SC device 250 may provide service announcements to user device 210 that include information (e.g., multicast service identifier, time of transmission, description of content, etc.) that may allow user device 210 to receive content relating to eMBMS.

Content provider 270 may include one or more network devices, or other types of computation or communication devices that gather, process, and/or provide information in a manner described herein. For example content provider 270 may send, via BM-SC device 250, content to user device 210.

The content is intended to be broadly interpreted to include any computer readable data that may be transferred over a network. Content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

Figure 3:
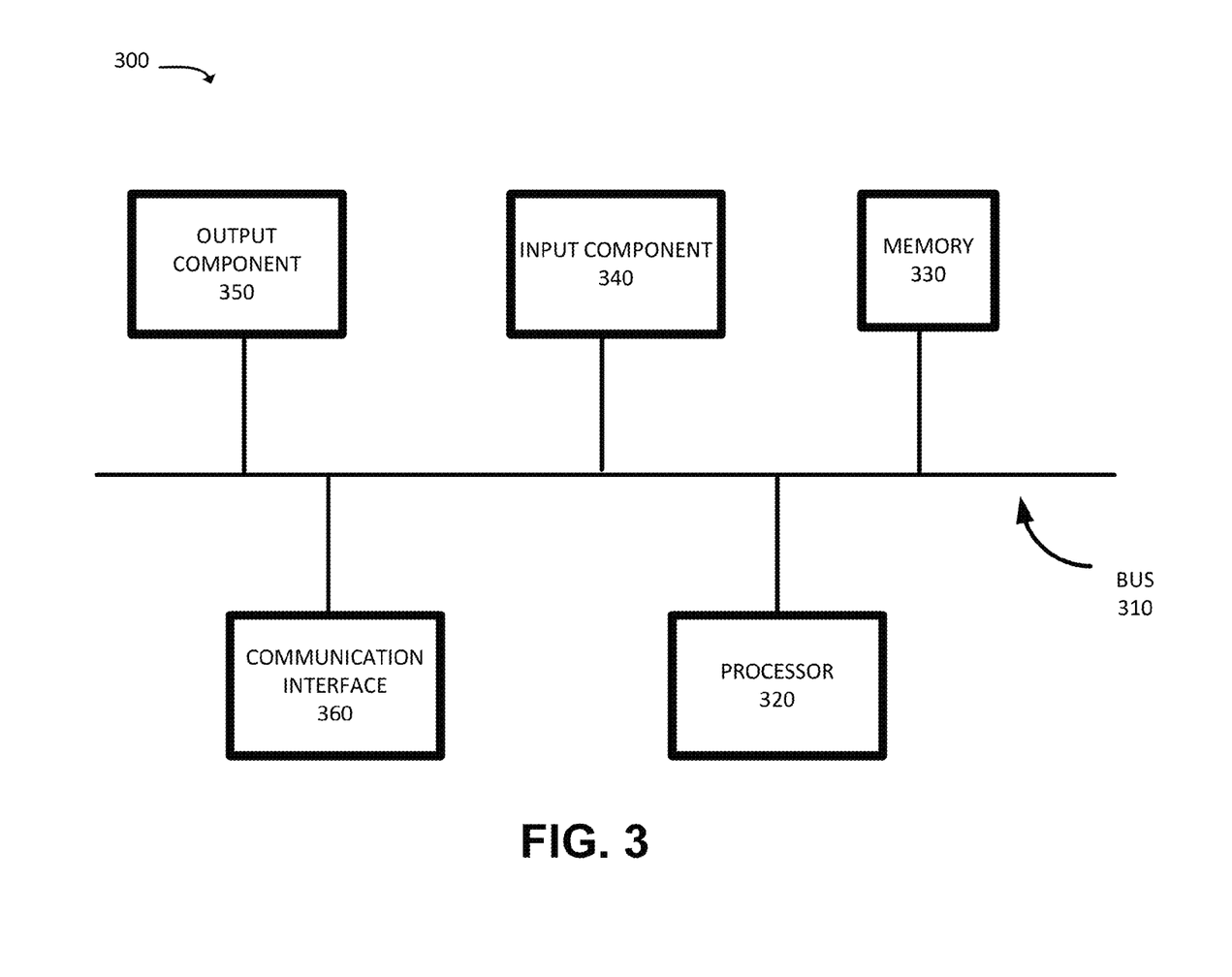
FIG. 3 is a diagram of example components of one or more devices of FIGS. 1 and 2.

FIG. 3 is a diagram of example components of a device 300. Device 300 may correspond to user device 210, UICC 215, base station 220, BSF device 230, HSS/AAA server 240, BM-SC device 250, and content provider 270. Additionally, or alternatively, each of user device 210, UICC 215, base station 220, BSF device 230, HSS/AAA server 240, BM-SC device 250, and/or content provider 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interpret and execute instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with a network (described with regard to FIG. 2) and/or devices connected to a network (described with regard to FIG. 2).

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
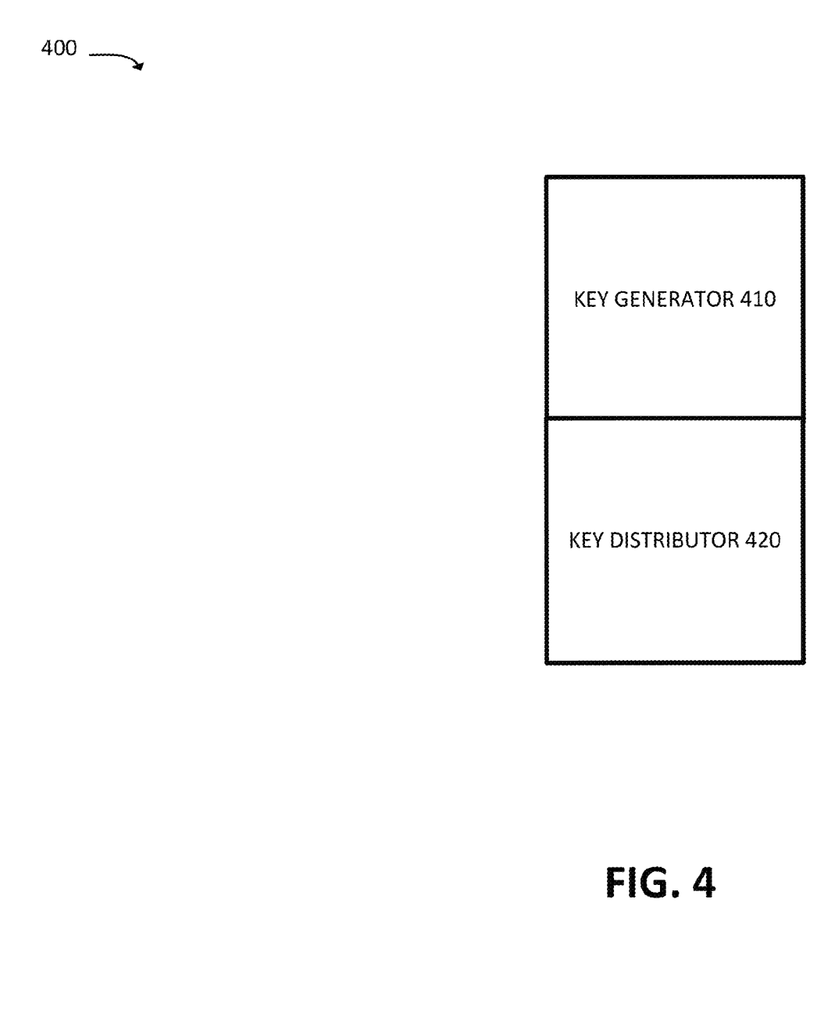
FIG. 4 is a functional diagram of an example operation capable of being performed by an example portion of the environment in FIG. 2.

FIG. 4 is a diagram of example functional components of a device 400 that may correspond to BSF device 230, or another network device. As illustrated, device 400 may include a key generator 410, and a key distributor 420. Each of functional components 410-420 may be implemented using one or more components of device 300 or by one or more devices 300. One of the functional components in FIG. 4 may perform one or more tasks described as being performed by the other functional component of FIG. 4.

BSF device 230 may individually include all of the functional components depicted in FIG. 4, or the functional components depicted in FIG. 4 may be distributed singularly or duplicatively in any manner between the devices illustrated in FIG. 2. In some implementations, BSF device 230 may include other functional components (not shown) that aid in creating and sending secret keys to other devices.

Key generator 410 may generate one or more different types of secret key that are used to protect (e.g., by encryption) content being sent from a content provider (e.g., content provider 270) to user device 210. Key generator 410 may generate secret keys, such as a MBMS user key (hereinafter referred to as "MUK"), a MBMS request key (hereinafter referred to as "MRK"), a MBMS service key (hereinafter referred to as "MSK") and a MBMS transport key (hereinafter referred to as "MTK"). Each type of secret key may be used for an amount of time. After the amount of time, the secret key may no longer be valid. For example, assume that a MSK key may be used for three hours from the time the MSK key is created. After three hours, the MSK key may no longer be valid.

The MUK may be used to protect (e.g., by encryption) the transfer of the MSK from BSF device 230 to other devices (e.g., user device 210). The MRK may be used for mutual authentication between user device 210 and BM-SC device 250.

The MSK and MTK may be generated after user device 210 is authenticated. The MSK may be used to encrypt the transfer of the MTK from BSF device 230 to other devices (e.g., user device 210 and BM-SC device 250). The MTK may be used by a network device (e.g., BM-SC server 250) to encrypt content from content provider 270 and the same MTK may be used by user device 210 to decrypt the content received by user device 210 from a network device, such as BM-SC device 250.

The MSK may be generated using information from three functional layers. The three functional layers may include bearer functional layer (unicast bearer, eMBMS bearer, or another type of bearer), delivery method functional layer (downloading, streaming, or another type of delivery method), and user service/application functional layer (packet-switched streaming service, file downloading, carousel services, television service, downloading service, multimedia messaging service, or another type of service/application). The input parameters, based on the three functional layers, for the MSK generation may include RANDg, length of RANDg, bearer, length of bearer, delivery method, length of delivery method, user service, length of user service, content, and/or length of content. The MSK (and the MTK) may have an identifier associating the MSK (and the MTK) to the type of content and/or service that is being protected. The type of content may be video content, audio content, textual content, or any other type of content. The type of content may also be a particular type of content, such as a particular movie, a live sporting event being broadcast to subscribers of the event, or any other particular type of content. The type of content may be provided for free or may be charged (e.g., by a content provider or by a network service provider) for a fee. For example, if the content is video, the MSK (and the MTK) may have an identifier that indicates that the type of content is video and/or the service being protected is a video service.

The MTK may be generated by using the MSK and other variables, such as log-in credentials for BM-SC device 250, BSF device 230, key word character strings associated with a mobile virtual network operator ("MVNO") associated with the operation of a network, described with regard to FIG. 2, and other variables associated with the network and/or other network devices.

Key distributor 420 may send a secret key, generated by key generator 410, to other network devices (e.g., BM-SC 250) and/or user device 210. In some implementations, key distributor 420 may use the multimedia Internet KEYing protocol (hereinafter referred to as "MIKEY protocol") to send a generated secret key (e.g., MUK, MRK, MSK and/or MTK) to user device 210, BM-SC device 250 and/or any other network device. In some implementations, key distributor 420 may use other communication protocols (e.g., Internet Protocol ("IP")) to send generated secret keys.

Figure 5:
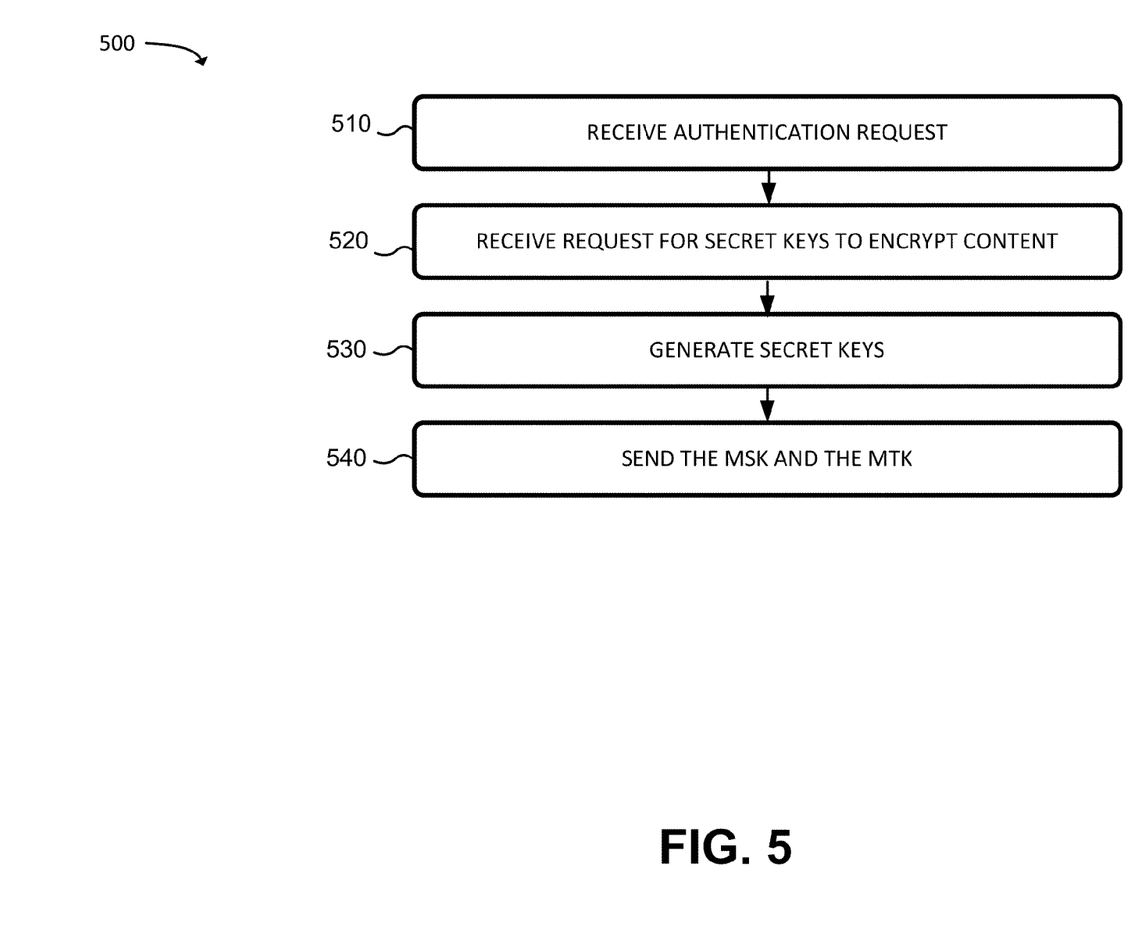
FIG. 5 is a flow chart of an example process for generating and sending a secret key.

FIG. 5 is a flow chart of an example process of generating and sending a secret key. In one example implementation, process 500 may be performed by BSF device 230. In another example implementation, one or more blocks of process 500 may be performed by one or more other devices, such as BM-SC device 250 or HSS/AAA server 240.

Process 500 may include receiving an authentication request (block 510). For example, BSF device 230 may receive an authentication request from user device 210. User device 210 may send the authentication request based on user device 210 requesting content from content provider 270 via BM-SC device 250. BM-SC device 250 may send a message to user device 210 that user device 210 is to be validated by BSF device 230 before content may be sent to user device 210.

User device 210 may send the authentication request to BSF device 230 so that user device 210 may be validated to receive content from content provider 270. BSF 230 may use a generic bootstrapping architecture (GBA) authentication procedure to validate user device 210. In the GBA authentication procedure, BSF 230 may send a message to HSS/AAA server 240. The message may include a request to determine whether user device 210 is permitted to use a LTE network and/or whether user device 210 is permitted to access content from content provider 270.

HSS/AAA server 240 may receive the message. HSS/AAA server 240 may determine that user device 210 is an authentic user device. HSS/AAA server 240 may authenticate user device 210, by determining that user device 210 is authorized to use the LTE network, and may send a message to BSF device 230 that user device 210 is authenticated.

Additionally, or alternatively, the message from BSF device 230 may include a request to determine whether the user account for accessing content from content provider 270 is valid. HSS/AAA server 240 may determine that the user account is valid, by accessing profile information (stored in HSS/AAA server 240) associated with user device 210 that identifies that the user account is valid, and send a message to BSF device 230 that the user account is valid.

BSF device 230 may send a message to user device 210 that user device 210 is authenticated. User device 210 may receive the message.

With user device 210 authenticated, BSF device 230 may create a bootstrapping transaction identifier (hereinafter referred to as B-TID). The B-TID is an identifier used to define the session during which user device 210 is validated by the network. BSF device 230 may store the B-TID. BSF device 230 may send the B-TID to user device 210. The B-TID may be valid for a limited amount of time. Assume that the B-TID is valid for a 10 hour time period. During this time period, user device 210 may receive content from content provider 270 via BM-SC device 250. Once the time period expires, user device 210 may have to request a new B-TID and go through the GBA authentication process to create the new B-TID.

In one example implementation, BSF device 230 may create secret keys from the GBA authentication process, using key generator 410, described with regard to FIG. 4. The secret keys may be the MUK and MRK, described with regard to FIG. 4. BSF device 230 may send the MUK to UICC 215 in user device 210 and the MRK to user device 210. The MUK may be used to encrypt the delivery of MSK to UICC 215 (in user device 210). For example, the MUK may encrypt the MSK, in a MIKEY message, being sent to UICC 215 (in user device 210). UICC 215 may use the same MUK (stored in UICC 215) to decrypt the MIKEY message and obtain the MSK.

BSF device 230 may send the MRK to user device 210. The MRK may be used for a mutual authentication between user device 210 and BM-SC device 250 during the transfer of content from BM-SC device 250 to user device 210.

In another example implementation, BSF device 230 may send authentication information to UICC 215 (in user device 210) and UICC 215 may generate the MUK and the MRK based on the authentication information received from BSF device 230. The MUK and the MRK generated by UICC 215 may be the same as the MUK and MRK stored in BSF device 230. UICC 215 may store the MUK and MRK. UICC may send the MRK to user device 210. The MUK and the MRK may be utilized in the same manner as the MUK and the MRK are used in the other example implementation.

User device 210 may send a message to BM-SC device 250 that indicates that user device 210 is authenticated. The message may include the B-TID. BM-SC device 250 may receive the message and send a request for the MUK and the MRK from BSF device 230. BM-SC device 250 may use the MUK and the MRK for authentication of user device 210 during the process of sending content.

BSF device 230 may receive the request for the MUK and the MRK from BSF device 230. BSF device 230 may determine, using key distributor 420, to send the MUK and the MRK to BM-SC device 250. The MUK may be used to encrypt the delivery of the MSK from BSF device 230 to BM-SC device 250. The MRK may be used by BM-SC device 250 to authenticate user device 210. User device 210 may also have the same MRK that may allow BM-SC device 250 to authenticate user device 210.

Process 500 may include receiving a request for secret keys to encrypt content (block 520). For example, BSF device 230 may receive a request for secret keys, MSK and MTK, to protect (e.g., by encryption) content being sent to user device 210. In one example implementation, BSF device 230 may receive the request from user device 210. In another example implementation, user device 210 may send the request to BM-SC device 250. BM-SC device 250 may receive the request. BM-SC device 250 may determine to forward the request to BSF device 230. BSF device 230 may receive the request from BM-SC device 250. In another example implementation, BSF device 230 may receive the request from BM-SC device 250.

Process 500 may include generating secret keys (block 530). For example, BSF device 230 may generate a MSK and a MTK, described with regard to FIG. 4. BSF device 230 may store the MSK and the MTK along with the B-TID associated with the session. In one example implementation, key generator 410 may have a key derivation function (e.g., HMAC-SHA-256(S)) used for generating the MSK for a specific service (e.g., such as video content from content provider 270). The MTK may be generated by using the same key derivation function and using other variables, described with regard to FIG. 4.

In another example implementation, the key derivation function (in key generator 410) may generate a MSK for a specific service (having an associated service identifier) by using another key derivation function (e.g., HMAC-SHA-256 (B-TID, S)). In this example implementation, the other key derivation function may use variables (described with regard to FIG. 4) so that a generated key may be associated with the B-TID. The MTK may be generated by using other variables (described with regard to FIG. 4) in the other key derivation function.

Process 500 may include sending the MSK and the MTK (block 540). BSF device 230 may send the MSK to BM-SC device 250 using, for example, the MIKEY protocol. BSF device 230 may protect the delivery of the MSK by using the MUK to encrypt the delivery of the MSK. BM-SC device 250 may receive the MSK by decrypting the MIKEY message using the MUK stored in BM-SC 250. BM-SC device 250 may store the MSK.

BSF device 230 may send the MTK to BM-SC device 250 using, for example, the MIKEY protocol. BSF device 230 may protect the delivery of the MTK by using the MSK to encrypt the delivery of the MTK. BM-SC device 250 may receive the MTK by decrypting the MIKEY message using the MSK stored in BM-SC 250. BM-SC device 250 may store the MTK. BM-SC device 250 may use the MTK to encrypt content from content provider 270, and BM-SC 250 may send the encrypted content (with the MTK) to content provider 270.

Additionally, BSF device 230 may send the MSK and the MTK to other devices similar to BM-SC device 250 using, for example, the MIKEY protocol, as described above.

In one example implementation, BSF device 230 may send the MSK to UICC 215 (in user device 210) using, for example, the MIKEY protocol. BSF device 230 may protect the delivery of the MSK by using the MUK to encrypt the delivery of the MSK. UICC 215 may receive the MSK by decrypting the MIKEY message using the MUK stored in UICC 215. UICC 215 may store the MSK.

In this example implementation, BSF device 230 may send the MTK to UICC 215 using, for example, the MIKEY protocol. BSF device 230 may protect the delivery of the MTK by using the MSK to encrypt the delivery of the MTK. UICC 215 may receive the MTK by decrypting the MIKEY message using the MSK stored in UICC 215. UICC 215 may store the MTK. UICC 215 may send the MTK to user device 210. User device 210 may use the MTK to decrypt encrypted content from BM-SC device 250. Alternatively, user device 210 may use the MTK to decrypt encrypted content from other BM-SC devices 250 that may provide content to user device 210 in other coverage areas of the network.

In another example implementation, BM-SC device 250 may send the MSK to UICC 215 (in user device 210) using, for example, the MIKEY protocol. BM-SC device 250 may protect the delivery of the MSK by using the MUK to encrypt the delivery of the MSK. UICC 215 may receive the MSK by decrypting the MIKEY message using the MUK stored in UICC 215. UICC 215 may store the MSK.

In this example implementation, BM-SC device 250 may send the MTK to UICC 215 using, for example, the MIKEY protocol. BM-SC device 250 may protect the delivery of the MTK by using the MSK to encrypt the delivery of the MTK. UICC 215 may receive the MTK by decrypting the MIKEY message using the MSK stored in UICC 215. UICC 215 may store the MTK. UICC 215 may send the MTK to user device 210. User device 210 may use the MTK to decrypt encrypted content from BM-SC 250. Alternatively, user device 210 may use the MTK to decrypt encrypted content from other BM-SC devices 250 that may provide content to user device 210 in other coverage areas of the network.

Figure 6:
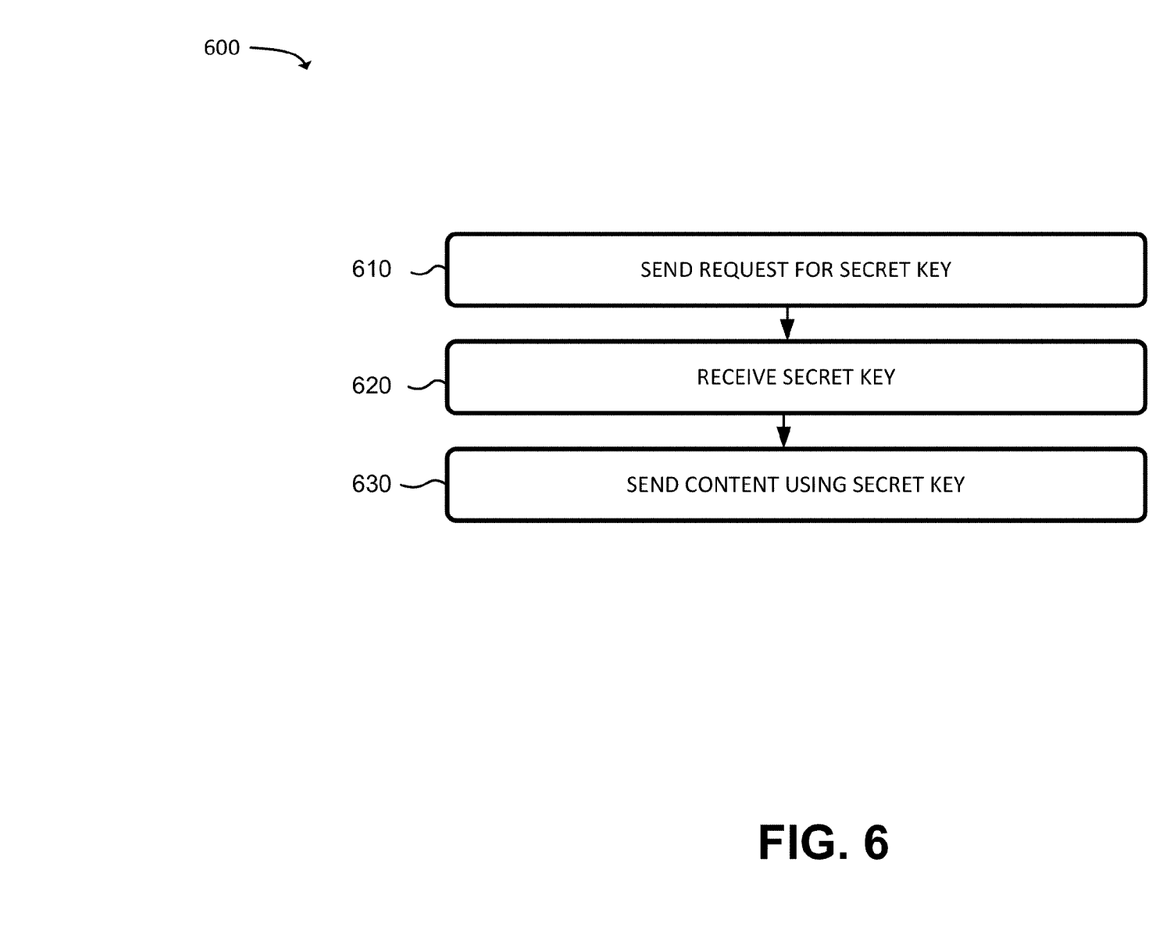
FIG. 6 is a flow chart of an example process for using a secret key.

FIG. 6 is a flow chart of an example process of receiving and using a secret key. In one example implementation, process 600 may be performed by BM-SC device 250. In another example implementation, one or more blocks of process 600 may be performed by one or more other devices, such as BSF device 230 or HSS/AAA server 240.

Process 600 may include sending a request for a secret key (block 610). For example, BM-SC device 250 may request one or more secret keys from BSF device 230. The secret keys may be the MSK and the MTK, described with regard to FIG. 4.

Process 600 may include receiving a secret key (block 620). For example, BM-SC device 250 may receive one or more secret keys from BSF device 230. BSF device 230 may generate the secret keys (e.g., the MSK and the MTK) described with regard to block 530 in FIG. 5. BSF device 230 may send the MSK and the MTK to BM-SC device 250 by using, for example, the MIKEY protocol, described with regard to block 530 in FIG. 5.

Process 600 may include sending content using the secret key (block 630). For example, content provider 270 may send content (e.g., a movie or streaming audio) to BM-SC device 250. BM-SC device 250 may use the MTK to encrypt the content to user device 210. User device 210 may receive the encrypted content and decrypt the content using the MTK (described with regard to FIG. 4) so that a user, of user device 210, may view and/or play the content.

Figure 7:
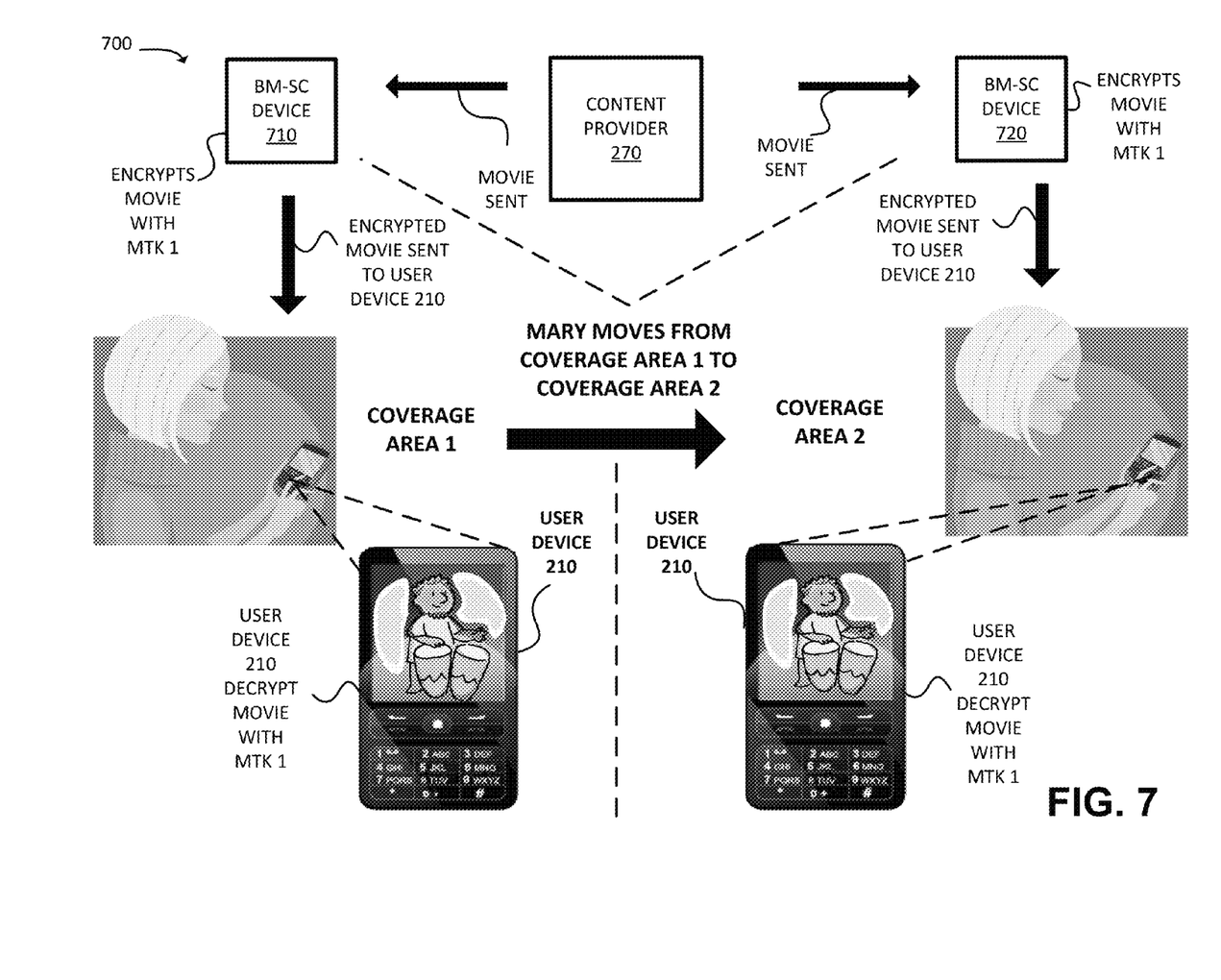
FIG. 7 is a diagram of an example process for using a secret key.

FIG. 7 is an example process 700 for using a secret key. FIG. 7 shows user device 210, content provider 270, BM-SC device 710, and BM-SC device 720. BM-SC device 710 and BM-SC device 720 may each correspond to BM-SC device 240, described with regard to FIG. 2.

As shown in FIG. 7, a user ("Mary"), of user device 210, is watching a movie on user device 210. Assume that user device 210 is a smart phone. Mary is sitting in a train that is travelling from San Francisco to Las Vegas. Assume that user device 210 has been authenticated by BSF device 230 and also assume that BSF device 230 has created and sent the secret keys (MUK, MRK, MSK, and MTK) to user device 210 and BM-SC devices 710 and 720. Mary is watching a movie that is securely being transmitted (e.g., encrypted using MTK) from content provider 270, via BM-SC device 710. BM-SC device 710 receives the movie from content provider 270, and BM-SC device 710 uses MTK 1 to encrypt the movie before sending the movie to user device 210. User device 210 may receive the encrypted movie from BM-SC device 710. User device 210 may use the MTK (stored in user device 210) to decrypt the movie, so that Mary can watch the movie on user device 210.

As Mary is watching the movie, the train passes from one coverage area ("area 1") of the wireless network to another coverage area ("area 2") of the wireless network. BM-SC device 720 provides service in coverage area 2. Assume that BSF device 230 has sent the same secret keys (MUK, MRK, MSK and MTK) to BM-SC device 720 as were sent to BM-SC device 710. When Mary moves from area 1 to area 2, the movie that Mary is watching may not be interrupted since the same secret key (MTK 1) is used to secure the transmission of the movie from content provider 270, via BM-SC device 720, to user device 210. User device 210 may receive the encrypted movie content from BM-SC device 720. User device 210 may use the MTK (stored in user device 210) to decrypt the movie, so that Mary can continue to watch the movie on user device 210.

Systems and/or methods described herein may generate a secret key that can be used to securely transmit content to a user device in multiple coverage areas of a network, instead of generating different secret keys for different coverage areas of the network. As a result, the generation of a single secret key for multiple coverage areas may prevent the interruption of content being transmitted to the user device each time that the user device changes to a different coverage area of a network.

The foregoing description of implementations provides illustration and description, but is not intended to be exhaustive or to limit the implementations to the precise form disclosed. Modifications and variations are possible in light of the above disclosure or may be acquired from practice of the implementations.

While the examples described in FIGS. 1-7 use the term eMBMS in regards to content, and/or a provider of content, MBMS may also include enhanced MBMS (eMBMS) or any other type of MBMS service. While the examples described in FIGS. 1-7 use the term "secret key," the term "security key," "key," "token," "secret token," "encryption key," or any other term may be used instead of "secret key."

While series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, by a network device of a content provider, a request for a first secret key and a second secret key,
the first secret key being used to encrypt the second secret key,
the second secret key being used to encrypt content being sent to a wireless user device, and
the content including one of an audio stream or a video stream;
generating, by the first network device and based on the request, the first secret key and the second secret key;
sending, by the network device and by using a multimedia Internet KEYing (MIKEY) protocol, the first secret key and the second secret key to a first broadcast/multicast service (BM-SC) device that provides service in a first coverage area of a network, the first BM-SC device sending a first portion of the content, encrypted with the second secret key, to the wireless user device when the wireless user device is located in the first coverage area of the network;

sending, by the first network device and by using the MIKEY protocol, the first secret key and the second secret key to a second BM-SC device that provides service in a second coverage area of the network, the second BM-SC device sending a second portion of the content, encrypted with the second secret key, to the wireless user device when the wireless user device is located in the second coverage area of the network, and the first coverage area of the network being different than the second coverage area of the network; and sending, by the first network device and by using the MIKEY protocol, the first secret key and the second secret key to the wireless user device, the wireless user device using the second secret key to decrypt the first portion of the content received from the first BM-SC device and the second portion of the content received from the second BM-SC device, and a user of the wireless user device being provided with the first portion of the content and the second portion of the content without interruption detectable by the user during a time when the wireless user device moves from the first coverage area of the network to the second coverage area of the network.

2. The method of claim 1, where sending the first secret key to the first BM-SC device and the second BM-SC device allows the wireless user device to continue receiving the content when the wireless user device moves from the first coverage area to the second coverage area.

3. The method of claim 1, where generating the first secret key includes:

generating the first secret key based on a bearer functional layer, a delivery method functional layer, and a user service/application functional layer.

4. The method of claim 3, where generating the first secret key based on the bearer functional layer, the delivery method functional layer, and the user service/application functional layer includes:

using variables, associated with the bearer functional layer, the delivery method functional layer, and the user service/application functional layer, to generate the first secret key.

5. The method of claim 1, where sending the first secret key and the second secret key to the wireless user device includes:

sending the first secret key and the second secret key to a universal integrated circuit card located in the wireless user device.

6. The method of claim 1, where the first secret key and the second secret key are associated with an identifier, where the identifier associates the first secret key and the second secret key with a type of content, and where the method further comprises:

storing the identifier associated with the first secret key and the second secret key.

7. The method of claim 1, where the first secret key permits the wireless user device to decrypt the second secret key.

8. A system comprising:

a device to:

receive a request for a secret key, the secret key being used to encrypt a delivery of content being sent to a wireless user device;

generate the secret key based on receiving the request;

send, by using a multimedia Internet KEYing (MIKEY) protocol, the secret key to a first broadcast/multicast service (BM-SC) device associated with a first coverage area of a network, the first BM-SC device sending a first portion of the content, encrypted with the secret key, to the wireless user device when the wireless user device is located in the first coverage area of the network;

send, by using the MIKEY protocol, the secret key to a second BM-SC device associated with a second coverage area of the network, the second BM-SC device sending a second portion of the content, encrypted with the secret key, to the wireless user device when the wireless user device is located in the second coverage area of the network; and send, by using the MIKEY protocol, the secret key to the wireless user device, the wireless user device using the secret key to decrypt the first portion of the content received from the first BM-SC device and the second portion of the content received from the second BM-SC device, and a user of the wireless user device being provided with the first portion of the content and the second portion of the content without interruption detectable by the user during a time when the wireless user device moves from the first coverage area of the network to the second coverage area of the network.

9. The system of claim 8, where the secret key is generated based on variables associated with a bearer layer, a delivery method layer, or a user service/application layer.

10. The system of claim 8, where the device:

generates a second secret key based on receiving the request; and encrypts messages that include the secret key by using the second secret key, and where sending the secret key to the first BM-SC device, the second BM-SC device, and the wireless user device includes sending the encrypted messages.

11. The system of claim 8, where the device sends the secret key to a particular device, and where the particular device sends a third portion of the content, encrypted with the secret key, to the wireless user device when the first BM-SC device and the second BM-SC device are not sending content to the wireless user device.

12. The system of claim 8, where the secret key is associated with an identifier, where the identifier associates the secret key with a type of content sent from the first BM-SC device to the wireless user device, and where the device stores the identifier.

13. The system of claim 8, where the secret key is generated based on a bearer functional layer, a delivery method functional layer, or a user service/application functional layer.

14. A non-transitory computer-readable medium storing instructions, the instructions comprising:

a plurality of instructions, that when executed by one or more processors of one or more network devices, cause the one or more processors to:

receive a request for a secret key,
  the secret key being used to encrypt content sent to a wireless user device;
generate the secret key based on receiving the request;
send the secret key to a first broadcast/multicast service (BM-SC) device associated with a first coverage area of a network,
  the first BM-SC device sending a first portion of the content, encrypted with the secret key, to the wireless user device when the wireless user device is located in the first coverage area of the network;
send the secret key to a second BM-SC device associated with a second coverage area of the network,
  the second BM-SC device sending a second portion of the content, encrypted with the secret key, to the wireless user device when the wireless user device is located in the second coverage area of the network; and
send the secret key to the wireless user device,
  the wireless user device using the secret key to decrypt the first portion of the content received from the first BM-SC device and using the secret key to decrypt the second portion of the content received from the second BM-SC device, and
  a user of the wireless user device being provided with the first portion of the content and the second portion of the content without interruption detectable by the user during a time when the wireless user device moves from the first coverage area of the network to the second coverage area of the network.

15. The non-transitory computer-readable medium of claim 14, further comprising:
  one or more instructions that, when executed by the one or more processors, cause the one or more processors to:
    send the secret key to a third BM-SC device associated with a third coverage area of the network,
      the third BM-SC device sending content, encrypted with the secret key, to the wireless user device when the wireless user device is located in the third coverage area of the network, and
      the third coverage area of the network being different than the first coverage area of the network and the second coverage area of the network.

16. The non-transitory computer-readable medium of claim 14, where one or more instructions, of the plurality of instructions, to generate the secret key include one or more instructions to:
  generate the secret key using variables associated with a type of content, a type of delivery associated with the content, or a type of bearer associated with the content.

17. The non-transitory computer-readable medium of claim 14, where one or more instructions, of the plurality of instructions, to generate the secret key include one or more instructions to:
  generate the secret key as a multimedia broadcast multicast transport key.

18. The non-transitory computer-readable medium of claim 14, where one or more instructions, of the plurality of instructions, to generate the secret key include one or more instructions to:
  generate the secret key using a boot-strapping transaction identifier associated with the wireless user device.

19. The non-transitory computer-readable medium of claim 14, further comprising:
  one or more instructions that, when executed by the one or more processors, cause the one or more processors to:
    terminate the secret key after a finite amount of time; and
    prevent the wireless user device from using the secret key to decrypt the content after the finite amount of time.

20. The method of claim 1, where the method further comprises:
  terminating the secret key after a finite amount of time; and
  preventing the wireless user device from using the secret key to decrypt the content after the finite amount of time.

* * * * *